(12) United States Patent
Nakamura et al.

(10) Patent No.: US 6,252,703 B1
(45) Date of Patent: Jun. 26, 2001

(54) TRANSPARENT LAMINATE AND FILTER FOR USE FOR PLASMA DISPLAY PANEL USING THE TRANSPARENT LAMINATE

(75) Inventors: Toshitaka Nakamura; Kazuaki Sasa; Kazuhiko Miyauchi; Yoshihiro Hieda, all of Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/455,904

(22) Filed: Dec. 7, 1999

(30) Foreign Application Priority Data

Dec. 7, 1998 (JP) ................................. 10-346816

(51) Int. Cl.[7] ................................ G02B 5/26; G02B 5/28; G02B 5/22
(52) U.S. Cl. ........................... 359/360; 359/582; 359/585
(58) Field of Search ..................................... 359/359, 360, 359/580, 581, 582, 585

(56) References Cited

U.S. PATENT DOCUMENTS

| 5,071,206 | * | 12/1991 | Hood et al. | 359/360 |
| 5,337,191 | * | 8/1994 | Austin | 359/885 |
| 5,521,765 | * | 5/1996 | Wolfe | 359/360 |
| 5,591,529 | * | 1/1997 | Braatz et al. | 359/359 |
| 5,595,825 | * | 1/1997 | Guiselin | 428/428 |
| 6,031,653 | * | 2/2000 | Wang | 359/247 |
| 6,034,813 | * | 3/2000 | Woodard et al. | 359/360 |

FOREIGN PATENT DOCUMENTS

| 55-11804 | 1/1980 | (JP) . |
| 9-176837 | 7/1997 | (JP) . |
| 10-217380 | 8/1998 | (JP) . |
| 10-264287 | 10/1998 | (JP) . |

* cited by examiner

Primary Examiner—Jon Henry
(74) Attorney, Agent, or Firm—McGinn & Gibb, PLLC

(57) ABSTRACT

There is provided a transparent laminate which comprises a transparent substrate, and four to five units each of a high refractive index transparent film and a silver type transparent electrical conductor film. The units are laminated successively on a surface of the transparent substrate, and one high refractive index transparent film is further disposed as an outermost layer. The high refractive index transparent film is an optically transparent film having a refractive index of from 1.5 to 2.7. The silver type transparent electrical conductor film has a thickness in a range of from 5 to 20 nm. A thickness of the silver type transparent electrical conductor film disposed in a first layer with reference to the transparent substrate is substantially equal to a thickness of the silver type transparent electrical conductor film in an outermost layer with reference to the transparent substrate. A thickness of the silver type transparent electrical conductor film in each of other layers is 3/2(1±0.2) times as large as the thickness of the silver type transparent electrical conductor film in the first layer. A thickness of the high refractive index transparent film in a first layer with reference to the transparent substrate is substantially equal to a thickness of the high refractive index transparent film in an outermost layer with reference to the transparent substrate and is 7/2(1±0.2) times as large as the thickness of the silver type transparent electrical conductor film in the first layer. The thickness of the high refractive index transparent film in each of other layers is 7 (1±0.2) times as large as the thickness of the silver type transparent electrical conductor film in the first layer.

20 Claims, 3 Drawing Sheets

TRANSPARENT LAMINATE AND FILTER FOR USE FOR PLASMA DISPLAY PANEL USING THE TRANSPARENT LAMINATE

BACKGROUND OF THE INVENTION

1. Field of the Invention

The present invention relates to a transparent laminate and a filter using the transparent laminate for use in a plasma display panel (hereinafter referred to as PDP). Particularly, it relates to a PDP filter disposed on the front surface of a PDP for simultaneously cutting electromagnetic waves and near-infrared rays theoretically generated from the PDP, and a PDP display unit and a PDP front plate provided with the filter stuck thereto.

The present application is based on Japanese Patent Application No. Hei. 10-346816, which is incorporated herein by reference.

2. Description of the Related Art

Transparent laminates each having a metal thin film layer put between transparent dielectric film layers have been discussed with the advance of thin-film-forming technology represented by a vacuum vapor deposition method or a sputtering method. These transparent laminates can utilize both electrically conducting characteristic and infrared reflection characteristic of the metal thin film layer and can provide a function of preventing reflection of visible light on a metal surface by means of the transparent dielectric film layers. For example, these transparent laminates are used in transparent heat-insulating materials for solar cells, green houses for agriculture, window materials for buildings, show-cases for food, and so on, because these transparent laminates transmit visible light rays and reflect heat rays. Further, these laminates are used suitably in electrodes for liquid-crystal displays, electrodes for field light-emitters, electromagnetic wave shielding films, antistatic films, and so on, because these laminates are transparent and exhibit high electrically conducting characteristic. The configurations of these transparent laminates are disclosed, for example, in Japanese Patent Publications No. Sho. 55-11804, Hei. 9-176837, Hei. 10-217380, Hei. 10-264287, and so on.

On the other hand, with respect to display technology, a plasma display panel (hereinafter referred to as PDP) has been developed as a large-screen display in compliance with the wishes of reduction of thickness and weight and increase of screen size.

The PDP generates electric discharge in a gas mainly containing a rare gas, especially neon, enclosed in the panel. Fluorescent substances of R, G and B applied on cells in the panel are made to emit light by vacuum ultraviolet rays generated by the electric discharge. In this light-emitting process, electromagnetic waves and near-infrared rays unnecessary for the operation of the PDP are emitted simultaneously. Particularly, electromagnetic waves not only cause malfunctions of peripheral devices but also have a bad influence on human bodies. Accordingly, it is necessary to cut the electromagnetic waves.

Further, the wave length of the near-infrared rays emitted is in a range of from 850 to 1200 nm. On the other hand, the light-receiving sensitivity of remote controllers for domestic electrification products, karaoke, audio and video appliances, and so on, is in a range of from 700 to 1300 nm. There arises a problem that near-infrared rays emitted from the PDP cause the malfunctions of the remote controllers. Accordingly, it is necessary to cut the intensive near-infrared rays theoretically generated from the PDP.

Therefore, a filter capable of simultaneously cutting electromagnetic waves and near-infrared rays generated from the PDP has been discussed. For example, a plate, or the like, formed by sticking or thermally fusion-bonding an acrylic sheet having metal mesh or etching mesh embedded therein to an acrylic sheet mixed with a dye type material for absorbing near-infrared rays has been heretofore used as the filter. The mesh type filter was easy to obtain a low surface resistance value. The mesh type filter, however, had a problem in image blurring due to a moire phenomenon generated between pixel pitch and electrically conductive mesh, durability of a near-infrared absorbing material, and so on. Further, the amount of the near-infrared absorbing material to be added needed to increase in order to improve the near-infrared cut factor. With the increase of the amount of the near-infrared absorbing material, however, the defects of lowering of the visible light transmission factor and occurrence of color-eye could not be avoided.

On the other hand, application of the aforementioned transparent laminate to a PDP filter has been discussed. In the existing circumstances, there is, however, no transparent laminate sufficiently satisfying various characteristics such s electromagnetic wave shielding characteristic, near-infrared cutting characteristic, visible light transmission characteristic, low reflection characteristic, low surface resistance, surface mar-proofness, and so on.

SUMMARY OF THE INVENTION

An object of the present invention is to provide a transparent laminate especially suitably used as an optical basic member in a PDP filter, and a light and thin-type PDP filter which satisfies various characteristics such as electromagnetic wave shielding characteristic, near-infrared cutting characteristic, visible light transmission characteristic, visible light low reflection characteristic, low surface resistance, surface mar-proofness, and so on, required by the PDP filter and which is good in visual recognition characteristic. Another object of the present invention is to provide a PDP display unit and a PDP front plate provided with the PDP filter.

As a result of eager discussion in order to solve the above objects, the present inventors have attained the invention which is a transparent laminate comprising: a transparent substrate; and 4 to 5 units of high refractive index transparent films and silver type transparent electrical conductor films, each unit consisting of one high refractive index transparent film and one silver type transparent electrical conductor film, the 4 to 5 unit being laminated successively on a surface of the transparent substrate, so that one high refractive index transparent film is disposed as an outermost layer, each of the high refractive index transparent film being an optically transparent film having a refractive index of from 1.5 to 2.7, each of the silver type transparent electrical conductor film having a thickness in a range of from 5 to 20 nm, wherein the transparent laminate satisfies the conditions: 1̂ a thickness of the silver type transparent electrical conductor film disposed in a first layer with reference to the transparent substrate is substantially equal to a thickness of the silver type transparent electrical conductor film in an outermost layer with reference to the transparent substrate; 2̂ a thickness of the silver type transparent electrical conductor film in each of other layers is 3/2(1±0.2) times as large as the thickness of the silver type transparent electrical conductor film in the first layer; 3̂ a thickness of the high refractive index transparent film in a first layer with reference to the transparent substrate is substantially equal to a thickness of the high refractive index transparent film in an outermost layer with reference to the transparent substrate and is 7/2(1±0.2) times as large as the thickness of the silver type transparent electrical conductor film in the first layer; and 4 the thickness of the high refractive index transparent film in each of other layers is 7(1±0.2) times as large as the thickness of the silver type transparent electrical conductor film in the first layer.

Preferably, the high refractive index transparent film is a thin film made from one compound or two or more compounds selected from the group consisting of indium oxide, tin oxide, titanium dioxide, cerium oxide, zirconium oxide, zinc oxide, tantalum oxide, niobium pentoxide, and zinc sulfide. Further, preferably, the silver type transparent electrical conductor film is a thin film made from 90% or higher by weight of silver and one compound or two or more elements selected from the group consisting of gold, copper, palladium, platinum, manganese, and cadmium.

Further, the transparent laminate according to the present invention has been obtained by the examination on the factors such as the thickness, the number of configuration layers, the material, the refractive index, the forming manner, and so on, of each of the dielectric film and the silver type transparent electrical conductor film; and by suitable design. Other than the electromagnetic wave shielding characteristic, it is preferable that the transparent laminate has a visible light transmission factor of not lower than 50%, a visible light reflection factor of not higher than 10%, a surface resistance of not larger than 2 $\Omega/\square$ and a near-infrared cut factor of not lower than 80% in a region of wave length longer than 800 nm.

In other mode of the present invention, there is provided a PDP filter which comprises a transparent laminate as aforementioned, and a transparent hard coating layer having a thickness of not smaller than 1 $\mu$m and a refractive index in a range of from 1.4 to 1.9 is formed on a front surface of the high refractive index transparent film disposed in the outermost layer of the transparent laminate. Preferably, an anti-reflection layer having a thickness in a range of from 0.05 to 0.2 /$\mu$m and a refractive index in a range of from 1.3 to 1.6 is formed on an upper surface of the transparent hard coating layer. A film having a transparent hard coating layer and an anti-reflection layer formed on one surface of another transparent film substrate may be prepared and bonded to a front surface of the high refractive index transparent film in the outermost layer of the transparent laminate through a transparent pressure sensitive adhesive layer formed on the other surface of the other transparent film substrate.

In a PDP filter according to the present invention, preferably, a transparent pressure sensitive adhesive layer having a thickness in a range of from 10 to 500 $\mu$m is formed on a rear surface of the transparent laminate. It is possible to provide a plasma display panel display unit, wherein a filter is bonded to a front display glass portion of a plasma display panel through a transparent pressure sensitive adhesive layer. It is possible to provide a PDP front plate, wherein the front plate is provided with a filter, and a transparent molded body disposed through an air layer on the front side of the plasma display panel, the filter being bonded through a transparent pressure sensitive adhesive layer to a surface of the transparent molded body opposite to the plasma display panel side. In this case, an anti-glare layer or an anti-Newton-ring layer may be formed directly on the plasma display panel side of the transparent molded body disposed through the air layer or is formed on a transparent film and bonded through a transparent pressure sensitive adhesive layer to the plasma display panel side of the transparent molded body.

Similarly, in the PDP front plate, a PDP filter is bonded through a transparent pressure sensitive adhesive layer to a PDP side surface of a transparent molded body disposed through an air layer on a front side of the PDP, and a hard coating layer and an anti-reflection layer are formed directly on a surface of the transparent molded body opposite to the PDP side or is formed on a transparent film and bonded through a transparent pressure sensitive adhesive layer to the surface of the transparent molded body opposite to the PDP side.

Similarly, the PDP display unit may be provided with a PDP front plate, wherein an anti-glare layer or an anti-Newton-ring layer may be formed directly on a front display glass portion of a PDP or may be formed on a transparent film and bonded through a transparent pressure sensitive adhesive layer to the front display glass portion of the PDP.

Features and advantages of the invention will become understood from the following detailed description of the preferred embodiments described in conjunction with the attached drawings.

DETAILED DESCRIPTION OF THE PREFERRED EMBODIMENTS

Respective embodiments of a transparent laminate and a PDP filter according to the present invention will be described specifically below with reference to FIGS. 1 and 2.

Figure 1:
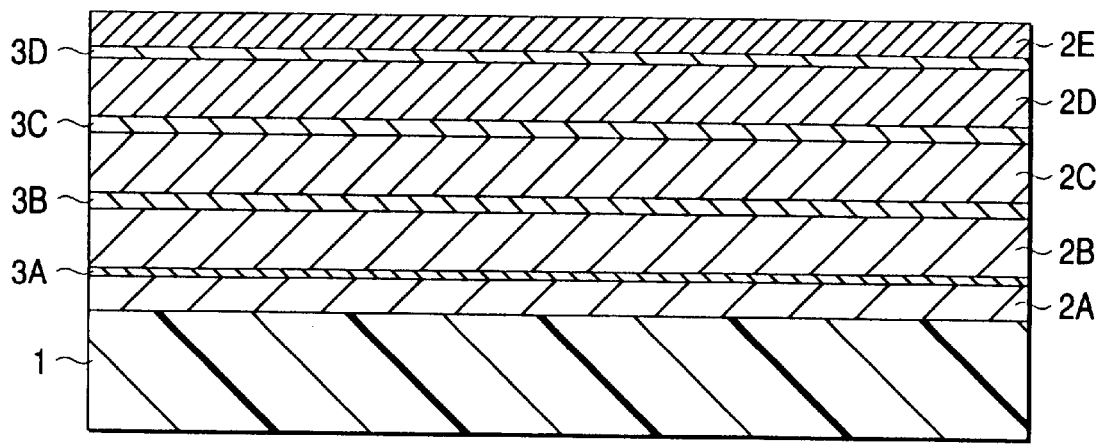
FIG. 1 is a schematic sectional view showing an embodiment of a transparent laminate according to the present invention.

FIG. 1 is a schematic sectional view of a transparent laminate in which: high refractive index transparent films (2A, 2B, 2C and 2D) and silver type transparent electrical conductor films (3A, 3B, 3C and 3D) are laminated on a surface of a transparent substrate 1 so that units (for example, 4 units in FIG. 1) each consisting of a combination of a high refractive index transparent film and a silver type transparent electrical conductor film are provided successively; and a high refractive index transparent film 2E is further formed as its outermost layer.

The silver type transparent electrical conductor films are designed as follows. The thickness of each of the silver type transparent electrical conductor films is in a range of from 5 to 20 nm. The thickness of the silver type transparent electrical conductor film 3A in the first layer with reference to the transparent substrate 1 is substantially equal to the thickness of the silver type transparent electrical conductor film 3D in the outermost layer. The thickness of each of the other silver type transparent electrical conductor films 3B and 3C is 3/2(1±0.2) times, that is, 1.2 to 1.8 times as large as the thickness of the silver type transparent electrical conductor film 3A in the first layer.

The high refractive index transparent films are designed as follows. Each of the high refractive index transparent films is an optically transparent film having a refractive index of from 1.5 to 2.7. The thickness of the high refractive index transparent film 2A in the first layer with reference to the transparent substrate 1 is substantially equal to the thickness of the high refractive index transparent film 2E in the outermost layer. The thickness of each of the high refractive index transparent films 2A and 2E is 7/2(1±0.2) times, that is, 2.8 to 4.2 times as large as the thickness of the silver type transparent electrical conductor film 3A in the first layer. The thickness of each of the other high refractive index transparent films 2B, 2C and 2D is 7(1±0.2) times, that is, 5.6 to 8.4 times as large as the thickness of the silver type transparent electrical conductor film 3A in the first layer.

Figure 2:
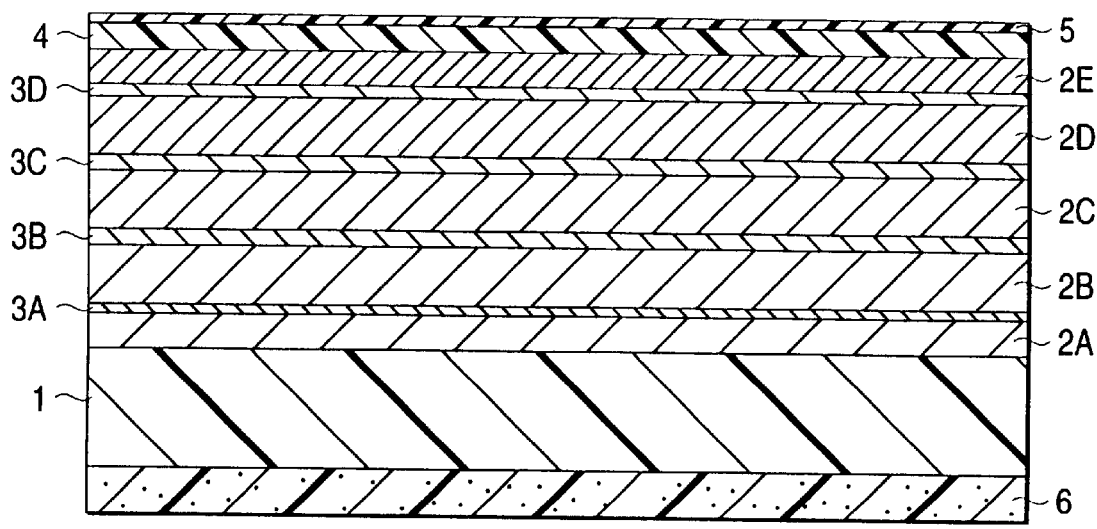
FIG. 2 is a schematic sectional view showing an embodiment of a filter for a plasma display panel according to the present invention.

FIG. 2 is a sectional view showing an example of a PDP filter using the transparent laminate depicted in FIG. 1. In FIG. 2, a transparent hard coating layer 4 is formed on a front surface of the high refractive index transparent film 2E in the outermost layer and an anti-reflection layer 5 is further formed on an upper surface of the transparent hard coating layer 4. A transparent pressure sensitive adhesive layer 6 provided for sticking the PDP filter is formed on a rear surface of the transparent laminate, that is, on a rear surface of the transparent substrate 1.

When, for example, the thickness of the silver type transparent electrical conductor film 3A is set to be 10 nm, the thicknesses of respective films in the above description with reference to FIGS. 1 and 2 are determined successively as follows.

The thickness of each of the silver type transparent electrical conductor films 3A and 3D is equal to 10 nm. The thickness of each of the silver type transparent electrical conductor films 3B and 3C is equal to 15 nm±2 nm. The thickness of each of the high refractive index transparent films 2A and 2E is equal to 35 nm±7 nm. The thickness of each of the high refractive index transparent films 2B, 2C and 2D is equal to 70 nm±14 nm.

Any substrate having transparency in a visible light region and having some degree of surface smoothness may be used as the transparent substrate 1 in the present invention. For example, polyethylene terephthalate, triacetyl cellulose, polyethylene naphthalate, polyether sulfone, polycarbonate, polyacrylate, polyether ether ketone, or the like, is preferable. The thickness of the substrate is not limited unless there is any problem in heat-wrinkling, or the like, in a dry process. Generally, a substrate having a thickness of from 10 to 250 $\mu$m is used. A macromolecular film per se may be used as the substrate or a macromolecular film having a single surface or opposite surfaces coated with a hard coating material may be used as the substrate. The substrate may be of an ultraviolet-curable type or of a heat-curable type. The thickness of the substrate is preferably in a range of from 1 to 10 $\mu$m.

Any optical film material having a high refractive index may be used to some degree as a material for the high refractive index transparent films. The refractive index of the thin film is preferably in a range of from 1.9 to 2.5. If the refractive index of each of the high refractive index transparent films is smaller than 1.9, the high refractive index transparent film may crack easily when it is provided as a multi-layer film because the high refractive index transparent film needs to be thick. Further, as the refractive index of each of the high refractive index transparent films increases, not only the thickness of each of the silver type transparent electrical conductor films increases easily but also the resistance thereof decreases easily without spoiling visible light transmission characteristic. Further, a single film of a high refractive index dielectric may be used or a sintered material made from a plurality of high refractive index dielectrics may be used. Further, a material having a silver migration resisting effect and a water/oxygen barrier effect may be used more preferably.

Examples of a preferred material for the high refractive index transparent films include: a material containing indium oxide as a main component and containing a small amount of titanium dioxide, tin oxide or cerium oxide; titanium dioxide; zirconium oxide; zinc sulfide; bismuth oxide; niobium pentoxide; and so on. These thin-film layers may be provided by a vacuum dry process such as sputtering, vacuum vapor deposition, ion-plating, or the like.

A material for the silver type transparent electrical conductor films contains not less than 90% by weight of silver, and one element or two or more elements selected from the group consisting of gold, copper, palladium, platinum, manganese, and cadmium. A solid solution containing 90 to 99% by weight of silver, and 1 to 10% by weight of the aforementioned metal is preferably used as the material. Especially, a solid solution containing 1 to 10% by weight of gold in silver is preferable in terms of prevention of deterioration of silver. If the amount of gold to be mixed is larger than 10% by weight, specific resistance increases so that it is difficult to obtain a low resistance value. If the amount of gold is smaller than 1% by weight, deterioration of silver occurs easily. A vacuum dry process such as a sputtering method, or the like, is used as means for forming the silver type transparent electric conductor films. The thickness of each of the silver type transparent electrical conductor films is suitably in a range of from 5 to 20 nm, preferably in a range of from 9 to 17 nm.

For application of the aforementioned transparent laminate to a PDP filter, it is necessary to improve surface mar-proofness. As shown in FIG. 2, it may be necessary that a transparent hard coating layer 4 having a thickness of not smaller than 1 $\mu$m and having a refractive index of from 1.4 to 1.9 is formed on a front surface of the high refractive index transparent film 2E in the outermost layer of the transparent laminate. If the transparent laminate is designed so as to suppress the visible light reflection factor with respect to the air layer having a refractive index of 1, the formation of the aforementioned transparent hard coating layer generally causes a problem that the visible light reflection factor increases. Accordingly, even in the case where an anti-reflection layer is formed on a surface of the transparent hard coating layer, the effect of the anti-reflection layer is very small.

On the contrary, the transparent laminate in which the respective thicknesses of high refractive index transparent films and silver type transparent electrical conductor films are designed according to the present invention, has characteristic that the visible light reflection factor decreases when a transparent hard coating layer 4 having a refractive index of from 1.4 to 1.9 is formed on the transparent laminate though the visible light reflection factor of the transparent laminate per se is higher than a target value. When an anti-reflection layer is further formed on a surface of the transparent hard coating layer 4, the visible light reflection factor can be reduced more greatly. Accordingly, a PDP filter satisfying both low visible light reflection factor and surface mar-proofness can be provided without spoiling characteristics such as electromagnetic wave shielding characteristic, visible light transmission factor, near-infrared cut factor, and so on, peculiar to the transparent laminate according to the present invention.

The transparent hard coating layer 4 having a refractive index of from 1.4 to 1.9 may be formed by a wet process such as a micro-gravure coating method, or the like, or may be formed by a dry process such as a vacuum vapor deposition method, a sputtering method, or the like. Any material may be used suitably for the transparent hard coating layer 4 without specific limitation irrespective of an inorganic type or an organic type so long as the material is excellent in visible light transmission characteristic, hard coating characteristic, durability and closely adhesive characteristic. Specific examples of the material include: a material obtained by polymerizing and hardening a polyfunctional polymerizable compound containing two or more acryloyl or methacryloyl groups, such as urethane (meth)acrylate, polyester (meth)acrylate, polyether (meth)acrylate, or the like, by activation energy rays such as ultraviolet rays, electron rays, or the like; a material obtained by cross-linking and hardening a silicon type, melamine type or epoxy type crosslinkable resin material by heat; and so on. The material is, however, not limited to the specific examples. The thickness of the transparent hard coating layer 4 is preferably in a range of from 1 to 10 $\mu$m. If the thickness is smaller than 1 $\mu$m, not only it is difficult to obtain a pencil hardness of not smaller than 2H but also optical interference becomes a subject of discussion. For example, in this case, optical characteristics such as a visible light reflection factor, and so on, change widely in accordance with a thickness change by 0.1 $\mu$m. If the thickness is larger than 10 $\mu$m, cracking occurs easily.

Any material may be used for the anti-reflection layer 5 so long as the material has a thickness of from 0.05 to 0.2 $\mu$m and a refractive index of from 1.3 to 1.6 and exhibits transparency in a visible light region. If the material has close adhesive characteristic with the hard coating layer, mar-proofness, antistatic characteristic and anti-smudge characteristic, the material may be used more preferably. Also the anti-reflection layer 5 may be formed by a wet process or may be formed by a dry process. Specific examples of the material include: a fluorine type polymer material having a low refractive index; $MgF_2$; $CaF_2$; $SiO_2$; and so on. Further, an anti-smudge layer may be formed on the anti-reflection layer so that the anti-smudge layer has a thickness of several nanometers enough to neglect optical interference. Examples of a material for the anti-smudge layer include: a hardened material of an organic polysiloxane type polymer or of a perfluoroalkyl-containing polymer; an alkoxysilane compound having a perfluoroalkyl group; a compound having a perfluoropolyether group and a reactive silyl group; a mono-/di-silane compound having a perfluoroalkyl group; and so on.

The aforementioned means of forming the hard coating layer 4 directly on a surface of the high refractive index transparent film 2E in the outermost layer and further forming the anti-reflection layer 5 on the hard coating layer 4 may be replaced by the following means. A film having a hard coating layer and an anti-reflection layer formed on one surface of another transparent film substrate and having a transparent pressure sensitive adhesive layer formed on the other surface of the transparent film substrate is prepared. The film is stuck directly to a front surface of the high refractive index transparent film 2E through the transparent pressure sensitive adhesive layer. In this case, a polyester film or a triacetyl cellulose film may be generally used as the transparent film substrate, but the transparent film substrate is not limited specifically. Any material may be used suitably for the hard coating layer and the anti-reflection layer so long as the material has the same characteristic as in the case where the hard coating layer and the anti-reflection layer are formed directly on a front surface of the high refractive index transparent film.

As shown in FIG. 2, the transparent pressure sensitive adhesive layer 6 is formed on the rear surface of the transparent substrate 1 for the PDP filter. When the transparent substrate 1 is stuck directly to the front display glass portion of the PDP through the transparent pressure sensitive adhesive layer 6, not only prevention of scattering of glass and reduction in weight, thickness and cost of the PDP per se can be achieved but also the air layer having a low refractive index is eliminated compared with the case where a front plate is disposed on a PDP body separately. Accordingly, the problem in increase of the visible light reflection factor due to superfluous interface reflection, double reflection, and so on, is solved, so that the visual recognition characteristic of the PDP is-improved greatly.

A material having an elastic modulus of from $1\times10^5$ to $1\times10^7$ dyne/$cm^2$ and a thickness of from 10 to 500 $\mu$m, preferably from 25 to 300 $\mu$m, is used for the transparent pressure sensitive adhesive layer in the present invention. Examples of the material include an acrylic type pressure sensitive adhesive, a rubber type pressure sensitive adhesive, a polyester type pressure sensitive adhesive, and so on. Especially, an acrylic type pressure sensitive adhesive is used preferably. As the acrylic type pressure sensitive adhesive, there is used a material formed by adding various additives such as a cross-linking agent, etc., to an acrylic type polymer. The acrylic type polymer is obtained by polymerizing a material including: at least one kind of alkyl (meth)acrylate esters exhibiting a glass transition point of not higher than $-10°$ C. when polymerized, as main monomers for giving moderate wetness and flexibility as a pressure sensitive adhesive layer; and, if necessary, functional group-containing monomers such as acrylic acid, methacrylic acid, 2-hydroxyethyl acrylate, etc., and other copolymerizable monomers, by a method such as a solution polymerization method, an emulsion polymerization method, a self-polymerization method (especially a polymerization method using ultraviolet rays), a suspension polymerization method, or the like, with use of a suitable polymerization catalyst. The transparent pressure sensitive adhesive may be of a heat-crosslinkable type or may be of a photo-crosslinkable type (using ultraviolet rays or electron rays).

When the transparent pressure sensitive adhesive layer having the aforementioned characteristic is used, the transparent substrate 1 can be stuck to the front display glass of the PDP well because the transparent pressure sensitive adhesive layer absorbs undulation of the PDP glass surface when the transparent substrate 1 is directly stuck to the front display glass of the PDP. Further, even in the case where an alien substance from the outside collides with the film after the sticking, not only the cushioning effect of the pressure sensitive adhesive layer prevents the film surface from being injured but also the instantaneously reduced thickness of the pressure sensitive adhesive layer is self-restored soon if the transparent pressure sensitive adhesive layer satisfies the aforementioned condition. That is, there is obtained characteristic that the film surface is restored to a smooth surface as if nothing occurred.

Further, in consideration of the fact that the strength of the front display glass is insufficient in a PDP producing process, a transparent molded body may be disposed, through an air layer, in the front side of the PDP so that a PDP filter according to the present invention is formed on the transparent molded body by use of various configurations. In this case, a glass plate, an acrylic plate, a polycarbonate plate, or the like, may be used preferably as the transparent molded body but there is no specific limitation.

Figure 3:
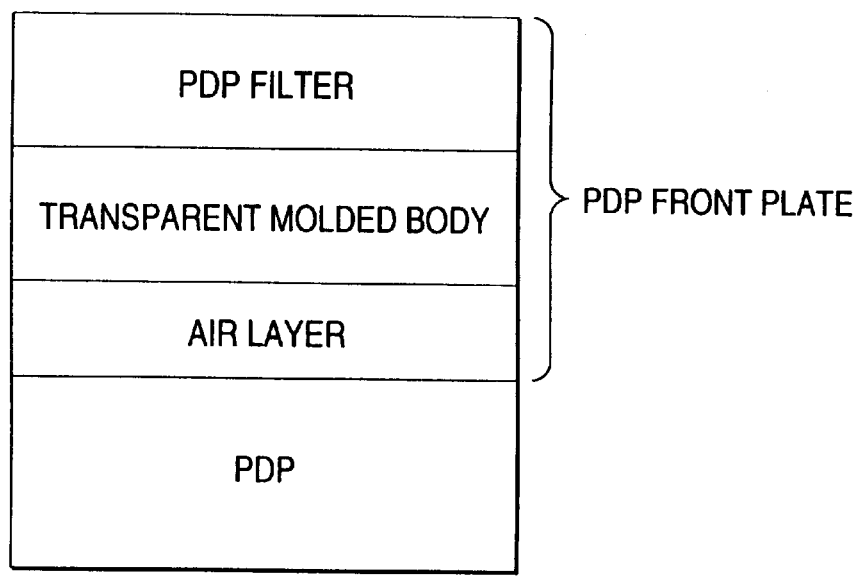
FIG. 3 is a schematic sectional view showing an embodiment of a front plate for a plasma display panel according to the present invention.
Figure 4:
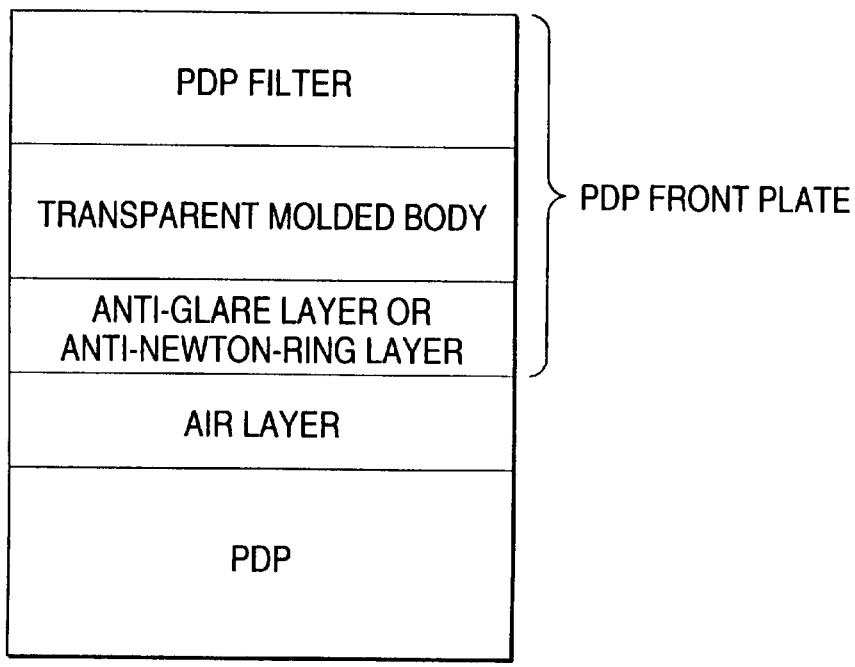
FIG. 4 is a schematic sectional view showing another embodiment of a front plate for a plasma display panel according to the present invention.

A PDP front plate made by the aforementioned process according to the present invention may be configured variously. As a first example of the configuration shown in FIG. 3, the PDP front plate is formed by sticking the PDP filter, through the transparent pressure sensitive adhesive layer 6, onto the transparent molded body disposed, through the air layer, on the front side of the PDP. Specifically, the PDP filter is stuck on a surface of the transparent molded body opposite to the PDP-side surface thereof. As a second example of the configuration shown in FIG. 4, an anti-glare layer or an anti-Newton-ring layer may be formed directly on the PDP-side surface of the transparent molded body in the first example or formed on a transparent film and stuck through the transparent pressure sensitive adhesive layer to the PDP-side surface of the transparent molded body in the first example in order to suppress the occurrence of double reflection and Newton rings. The terminology "anti-glare layer" or "anti-Newton-ring layer" used in the present invention means a layer which has slight surface roughness in a range of from about 0.1 μm to about 10 μm and which is transparent with respect to visible light rays. Known techniques may be applied to such an anti-glare layer or an anti-Newton-ring layer.

Figure 5:
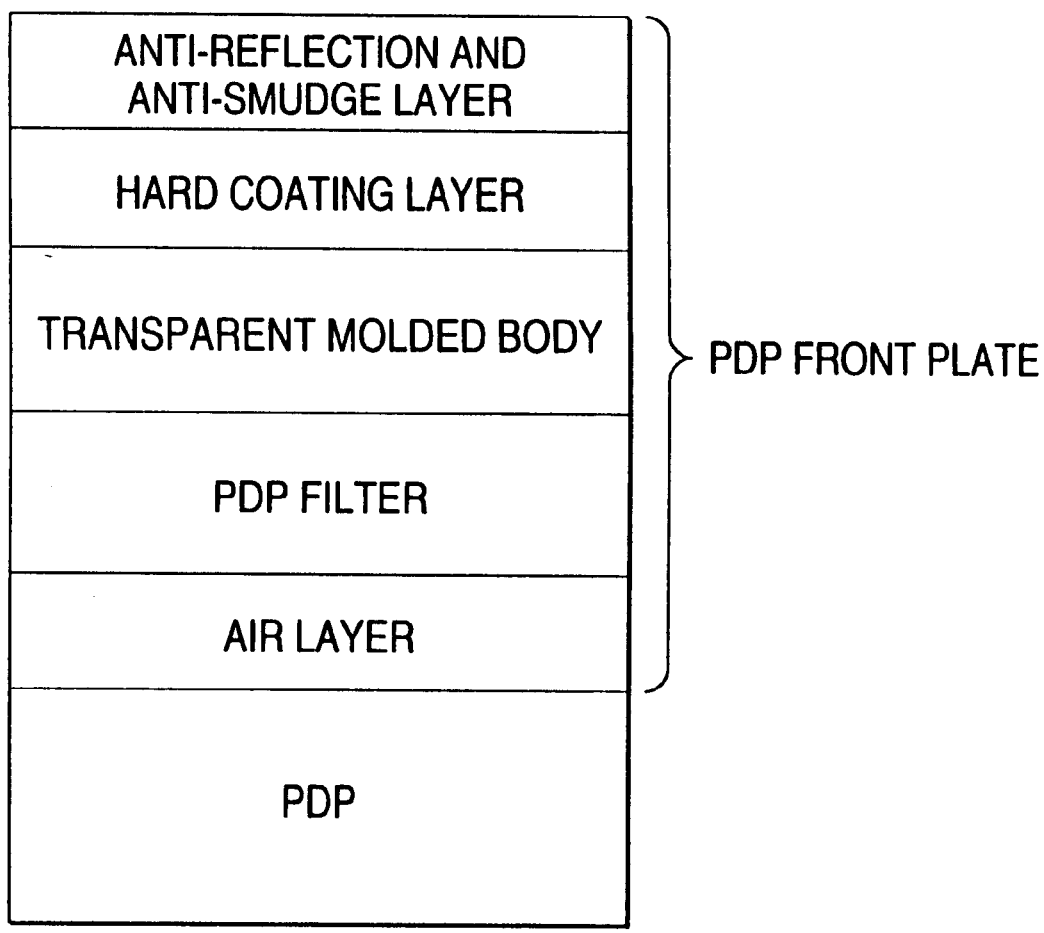
FIG. 5 is a schematic sectional view showing still another embodiment of a front plate for a plasma display panel according to the present invention.

As a third example of the configuration shown in FIG. 5, the PDP filter (transparent laminate) is stuck through the transparent pressure sensitive adhesive layer onto the PDP-side surface of the transparent molded body disposed through the air layer on the front side of the PDP, and a hard coating layer and an anti-reflection and anti-smudge layer are formed directly on a surface of the transparent molded body opposite to the PDP-side surface of the same or are once formed on a transparent film substrate and then stuck through a transparent pressure sensitive adhesive layer onto the above-mentioned opposite surface of the transparent substrate separately. In this case, the hard coating layer needs not be provided specially because the transparent laminate is not exposed to the outside directly.

Further, an anti-glare layer or an anti-Newton-ring layer may be formed directly on the surface of the transparent laminate or on the surface of the PDP front display glass or once formed on a transparent film and then stuck through the transparent pressure sensitive adhesive layer onto the surface of the transparent laminate or on the surface of the PDP front display glass in the aforementioned manner in order to suppress the occurrence of double reflection and Newton rings.

In the PDP filter or the PDP front plate in the present invention, a pigment, or the like, for adjusting the color tone of a transparent color may be used to be added, for example, to the transparent substrate, the transparent molded body, the transparent pressure sensitive adhesive or the transparent hard coating agent. Alternatively, a suitable layer obtained by dispersing the aforementioned pigment, or the like, in a binder resin may be provided on the PDP filter or the PDP front plate.

Further, an end portion of the transparent laminate having electrically conducting characteristic needs to be electrically connected to the PDP so that the electromagnetic wave shielding characteristic is prevented from being lowered due to electrical charges induced by absorbed electromagnetic waves. It is, however, difficult to achieve the electrical connection when a hard coating layer and an anti-reflection film layer are formed on a surface of the transparent laminate or when another film is stuck onto a surface of the transparent laminate. Accordingly, when the hard coating layer and the anti-reflection film layer are applied on the transparent laminate by a wet process or formed on the transparent laminate by a dry process or when another film is stuck onto the transparent laminate, these layers may be provided only in an opening portion so that electrical connection can be provided from an end portion of the transparent laminate. Electrically conductive paste, electrically conductive tape, vacuum vapor deposition, or the like, may be used for achieving the electrical connection, but the electrical connection means is not limited thereto.

The present invention will be described more specifically on the basis of examples thereof, but the present invention is not limited to the examples.

EXAMPLE 1

A transparent laminate was produced by forming thin films on one surface of a 125 μm-thick transparent polyethylene terephthalate (PET) film by a DC magnetron sputtering method while repeating the sequence of a high refractive index transparent film, a silver type transparent electrical conductor film and a high refractive index transparent film.

$In_2O_3$ containing 12.6% by weight of $TiO_2$ was used as a target material for forming the high refractive index transparent film. Ag containing 5% by weight of Au was used as a target material for forming the silver type transparent electrical conductor film. The measurement of film thickness was performed based on both the analytical curve of film-forming speed obtained by a surface roughness tester (DEKTAK3) with respect to a film attached to a thick film and the precision measurement by a transmission electron microscope. Lorester SP made by Mitsubishi Petrochemical Co., Ltd. was used for the measurement of the surface resistance value. Further, optical characteristic was measured by use of U-3410 made by Hitachi, Ltd. Particularly, the reflection factor was measured after a surface having no thin film formed thereon was painted with black. The visible light transmission factor and the visible light reflection factor were calculated on the basis of the obtained transmission and reflection spectra according to JIS R-3016.

A sample 1̂-A was produced by laminating 4 units each consisting of a combination of a high refractive index transparent film and a silver type transparent electrical conductor film successively on the aforementioned PET film and further laminating a high refractive index transparent film as the outermost layer so that the thicknesses of the respective films were as follows.
1̂-A: 35/10/70/15/70/15/70/10/35 (nm)

Another sample 2̂-A was produced by laminating 5 units each consisting of a combination of a high refractive index transparent film and a silver type transparent electrical conductor film successively on the aforementioned PET film and further laminating a high refractive index transparent film as the outermost layer so that the thicknesses of the respective films were as follows.
2̂-A: 35/10/70/15/70/15/70/15/70/10/35 (nm)

Comparative Example 1

A sample 3̂-A was produced by laminating 3 units each consisting of a combination of a high refractive index transparent film and a silver type-transparent electrical conductor film successively on the PET film and further laminating a high refractive index transparent film as the outermost layer in the same manner as in Example 1 so that the thicknesses of the respective films were as follows.
3̂-A: 35/10/70/15/70/10/35 (nm)

The filter characteristic of each of the transparent laminate samples 1̂-A to 3̂-A thus produced was measured. Results of the measurement were shown in Table 1.

TABLE 1

FILTER CHARACTERISTIC OF SAMPLE

| Characteristic Item | ①-A | ②-A | ③-A |
|---|---|---|---|
| Surface Resistance (Ω/□) | 1.6 | 1.2 | 2.4 |
| Visible Light Transmission Factor (%) | 60 | 54 | 65 |
| IR Cut Factor (>850 nm) (%) | 96 or more | 98 or more | 90 or more |
| Visible Light Reflection Factor (%) | 6.9 | 6.3 | 9.2 |

It was apparent from Table I that a low surface resistance value and a high near-infrared (IR) cut factor were obtained in each of the samples 1̂-A and 2̂-A in Example 1 designed within the scope of the present invention and that the visible light transmission factor in each of the samples 1̂-A and 2̂-A was also at a practically allowable level. The visible light reflection factor was, however, high and not at a practical-use level. The sample 3̂-A in Comparative Example 1 was superior in visible light transmission factor but inferior in both surface resistance value and near-infrared (IR) cut factor to the samples 1̂-A and 2̂-A in Example 1.

Further, any one of the samples 1̂-A to 3̂-A produced could not pass a mar-proof test (in which the sample was rubbed with steel wool #0000 ten times under a load of 250 g/cm2), so that remarkable scratches were observed after the test.

EXAMPLE 2

An ultraviolet-curable type hard coating resin (mainly containing trade name: UNIDIC 17-813 made by Dai Nippon Ink & Chemicals Inc.) having a refractive index of 1.55 was formed, by-a micro-gravure coating method, on the high refractive index transparent film in each of the two transparent laminate samples 1̂-A and 2̂-A obtained in Example 1. Thus, samples 1̂-B and 2̂-B each having a 5 μm-thick hard coating layer were produced.

Comparative Example 2

A 5 μm-thick hard coating layer which was the same as in Example 2, was formed on the high refractive index transparent film in the transparent laminate sample 3̂-A obtained in Comparative Example -1. Thus, a sample 3̂-B was produced.

EXAMPLE 3

An alkoxsilane type transparent coating material (trade name: LR201 made by Nissan Chemical Industries, Ltd.) having a refractive index of 1.36 was applied, by a gravure coating method, on the hard coating layer formed on the high refractive index transparent film in each of the samples 1̂-B and 2̂-B obtained in Example 2. Then, the coating material was hardened under the condition of 150° C. and for 5 minutes so that there was formed a 100 nm-thick anti-reflection layer. Thus, samples 1̂-C and 2̂-C were produced.

Comparative Example 3

A 100 nm-thick anti-reflection layer which was the same as in Example 3, was formed on the hard coating layer formed on the high refractive index transparent film in the sample 3̂-B obtained in Comparative Example 2. Thus, a sample 3̂-C was produced.

In each of the samples obtained in Examples 1 to 3 and Comparative Examples 1 to 3, the visible light reflection factors before and after the formation of the hard coating layer and the anti-reflection layer were compared with each other. Results of the comparison were shown in Table 2.

TABLE 2

REFLECTION FACTOR CHARACTERISTIC OF SAMPLE

| Untreated | | Formation of Hard Coating Layer | | Formation of Hard Coating and Anti-reflection Layers | |
|---|---|---|---|---|---|
| Sample | Reflection Factor | Sample | Reflection Factor | Sample | Reflection Factor |
| ①-A | 6.9 | ①-B | 4.9 | ①-C | 2.2 |
| ②-A | 6.3 | ②-B | 5.1 | ②-C | 2.4 |
| ③-A | 9.2 | ③-B | 6.2 | ③-C | 3.8 |

In Table 2, the "Reflection Factor" was expressed in visible light reflection factor (%).

It was confirmed that the visible light reflection factor in each of the transparent laminate samples 1̂-A and 2̂-A obtained by successively laminating a high refractive index transparent film, a silver type transparent electrically conductor film and a high refractive index transparent film in accordance with the scope of the present invention, was reduced by the formation of a hard coating layer and further reduced by the formation of an anti-reflection layer on a surface of the hard coating layer. In each of the obtained samples 1̂-C and 2̂-C, the visible light reflection factor could be reduced while the surface resistance value, the near-infrared (IR) cut factor and the visible light transmission factor were kept equal to those in each of the samples 1̂-A and 2̂-A in Table 1. Accordingly, each of the samples 1̂-C and 2̂-C may be used suitably as a PDP filter having surface mar-proofness which is indispensable to practical use.

On the other hand, the visible light reflection factor of the sample 3̂-C in Comparative Example was reduced compared with the samples 3̂-A and 3̂-B) before the formation of the hard coating layer and the anti-reflection layer. The visible light reflection factor of the sample 3̂-C, however, exhibited a still large value of 3.8%. The reflection factor of the sample 3̂-C in a wave length region of from 500 to 600 nm can be suppressed to be not larger than 2% but the reflection factors of the sample 3̂-C both in a blue region of about 450 nm and in a red region of about 650 nm exceed 15%. Further, the sample 3̂-C is insufficient both in surface resistance value and in near-infrared cur factor.

EXAMPLE 4

An anti-reflection film (trade name: REALOOK 2201 made by Nippon Oils & Fats Co., Ltd.) available on the market was stuck, through a transparent pressure sensitive adhesive layer, directly onto the high refractive index transparent film in each of the two samples 1̂-A and 2̂-A obtained in Example 1. Thus, samples 1̂-D and 2̂-D were produced. The visible light reflection factors of the samples 1̂-D and 2̂-D were 2.7% and 2.9% respectively. Each of the samples 1̂-D and 2̂-D was obtained as a PDP filter in which the surface resistance value, the near-infrared (IR) cut factor and the visible light transmission factor as other characteristics were kept substantially equal to those in each of the samples 1̂-A and 2̂-A in Table 1.

EXAMPLE 5

An acrylic type pressure sensitive adhesive solution containing 20% by weight of a solid component was applied onto a rear surface of the PET film substrate in the sample 1̂-C obtained in Example 3. The pressure sensitive adhesive solution was dried at 150° C. for 5 minutes so that there was formed a transparent pressure sensitive adhesive layer having a thickness of 100 μm and an elastic modulus of $1.0 \times 10^6$ dyne/cm$^2$. This sample was stuck directly onto a front display glass portion of a PDP by a roll laminator so that there was produced a PDP display unit. This PDP display unit was excellent in visual recognition characteristic because external light reflection, double reflection, etc. were suppressed sufficiently without spoiling the merits of small thickness and light weight peculiar to the PDP compared with the case where a front plate constituting a PDP filter was disposed. This PDP display unit was good in electromagnetic wave shielding characteristic, near-infrared cut factor, pencil hardness and surface mar-proofness because this PDP display unit succeeded to the characteristics of the sample 1̂-C as it was.

EXAMPLE 6

An acrylic type pressure sensitive adhesive solution containing 20% by weight of a solid component was applied onto a rear surface of the PET film substrate in the sample 1̂-C obtained in Example 3. The pressure sensitive adhesive solution was dried at 150° C. for 5 minutes so that there was formed a transparent pressure sensitive adhesive layer having a thickness of 100 μm and an elastic modulus of $1.0 \times 10^6$ dyne/cm$^2$. This sample was stuck onto one main surface of a 3 mm-thick PMMA plate (trade name: ACRYLITE made by Mitsubishi Rayon Co., Ltd.) by a roll laminator. Further, an anti-glare film (KB-N05S made by Kimoto Ltd.) available on the market was stuck onto the other surface of the PMMA plate through a transparent pressure sensitive adhesive layer having a thickness of 25 μm and being the same as described above. Thus, a PDP front plate was produced in which the anti-glare film was disposed oppositely to the front surface side of the PDP display unit. As a result, this front plate succeeded to the characteristics of the sample 2̂-C as it was. Further, in the PDP front plate, the anti-glare layer suppressed double reflection. Incidentally, haze increased because of the anti-glare layer.

EXAMPLE 7

An acrylic type pressure sensitive adhesive solution containing 20% by weight of a solid component was applied onto a rear surface of the PET film substrate in the sample 1̂-A obtained in Example 1. The pressure sensitive adhesive solution was dried at 150° C. for 5 minutes so that there was formed a transparent pressure sensitive adhesive layer having a thickness of 25 μm and an elastic modulus of $1.0 \times 10^6$ dyne/cm$^2$. This sample was stuck onto one main surface of a 3 mm-thick PMMA plate (trade name: ACRYLITE made by Mitsubishi Rayon Co., Ltd.) by a roll laminator. Further, an anti-reflection film (trade name: REALOOK 2201 made by Nippon Oils & Fats Co., Ltd.) available on the market was stuck onto the other surface of the PMMA plate through a transparent pressure sensitive adhesive layer. Thus, a PDP front plate was produced in which the high refractive index transparent film in the sample 1̂-A was disposed oppositely to the front surface side of the PDP display unit. Further, an anti-glare film (KB-N05S made by Kimoto Ltd.) available on the market was stuck onto the front glass plate of the PDP display unit through a 25 μm-thick transparent pressure sensitive adhesive, so that the PDP front plate was disposed. As a result, this PDP front plate had a low visible light reflection factor of 2.7%. With respect to other characteristics, the PDP front plate could succeed to the characteristics of the sample 1̂-A.

Further, in this case, the high refractive index transparent film in the sample 1̂-A was exposed as an electrically conducting surface. Accordingly, the PDP front plate in which ground connection was performed easily to improve the electromagnetic wave shielding effect could be provided.

In the transparent laminate according to the present invention, both specific optical design and surface treatment are performed when high refractive index transparent films and silver type transparent electrically conductor films are laminated successively. Accordingly, there can be provided a PDP filter which satisfies surface mar-proofness simultaneously in addition to electromagnetic wave shielding characteristic, near-infrared cutting characteristic, visible light transmission characteristic and visible light low reflection characteristic particularly required by a PDP. Further, the present invention may be used suitably in the case where the PDP filter is used so as to be stuck directly to a front glass plate of a PDP display unit or in the case where the PDP filter is used as a front plate to be stuck to a transparent substrate by various configurations. In any case, a PDP display unit excellent in optical characteristic can be provided.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A transparent laminate comprising:

a transparent substrate;

four to five units each comprising a high refractive index transparent film and a silver type transparent electrical conductor file, said four to five units being laminated successively on said transparent substrate; and an outermost high refractive index transparent film disposed on said four to five units, wherein said high refractive index transparent film is an optically transparent film having a refractive index of from 1.5 to 2.7, and said silver type transparent electrical conductor film has a thickness in a range of from 5 to 20 nm, wherein said transparent laminate satisfies the following conditions (i) to (iV):

(i) a thickness of the silver type transparent electrical conductor film disposed in a first layer with reference to said transparent substrate is substantially equal to a thickness of the outermost silver type transparent electrical conductor film in said four to five units with reference to said transparent substrate;

(ii) a thickness of the silver type transparent electrical conductor film in each of other layers is 1.2 to 1.8 times as large as the thickness of said silver type transparent electrical conductor film in the first layer;

(iii) a thickness of the high refractive index transparent film in a first layer with reference to said transparent substrate is substantially equal to a thickness of said outermost high refractive index transparent film, and is 2.8 to 4.2 times as large as the thickness of said silver type transparent electrical conductor film in the first layer; and (iv) the thickness of the high refractive index transparent film in each of other layers is 5.6 to 8.4 times as large as the thickness of said silver type transparent electrical conductor film in the first layer.

2. A transparent laminate according to claim 1, wherein said high refractive index transparent film is a thin film made from one compound or two or more compounds selected from the group consisting of indium oxide, tin oxide, titanium dioxide, cerium oxide, zirconium oxide, zinc oxide, tantalum oxide, niobium pentoxide, and zinc sulfide.

3. A transparent laminate according to claim 1, wherein said silver type transparent electrical conductor film is a thin film made from 90% or higher by weight of silver and one compound or two or more elements selected from the group consisting of gold, copper, palladium, platinum, manganese, and cadmium.

4. A transparent laminate according to claim 1, wherein said transparent laminate has a visible light transmission factor of not lower than 50%, a visible light reflection factor of not higher than 10%, a surface resistance of not larger than 2 Ω/□ and a near-infrared cut factor of not lower than 80% in a region of wave length longer than 800 nm.

5. A filter for a plasma display panel comprising:
(A) a transparent laminate comprising:
a transparent substrate;
four to five units each comprising a high refractive index transparent film and a silver type transparent electrical conductor film, said four to five units being laminated successively on said transparent substrate; and
an outermost high refractive index transparent film disposed on said four to five units,
wherein said high refractive index transparent film is an optically transparent film having a refractive index of from 1.5 to 2.7, and said silver type transparent electrical conductor film has a thickness in a range of from 5 to 20 nm,
wherein said transparent laminate satisfies the following conditions (i) to (iv):
(i) a thickness of the silver type transparent electrical conductor film disposed in a first layer with reference to said transparent substrate is substantially equal to a thickness of the outermost silver type transparent electrical conductor film in said four to five units with reference to said transparent substrate;
(ii) a thickness of the silver type transparent electrical conductor film in each of other layers is 1.2 to 1.8 times as large as the thickness of said silver type transparent electrical conductor film in the first layer;
(iii) a thickness of the high refractive index transparent film in a first layer with reference to said transparent substrate is substantially equal to a thickness of said outermost high refractive index transparent film, and is 2.8 to 4.2 times as large as the thickness of said silver type transparent electrical conductor film in the first layer; and
(iv) the thickness of the high refractive index transparent film in each of other layers is 5.6 to 8.4 times as large as the thickness of said silver type transparent electrical conductor film in the first layer; and
(B) a transparent hard coating layer being formed on said outermost high refractive index transparent film of said transparent laminate, said transparent hard coating layer having a thickness of not smaller than 1 μm and a refractive index in a range of from 1.4 to 1.9.

6. A filter for use in a plasma display panel according to claim 5, further comprising an anti-reflection layer having a thickness in a range of from 0.05 to 0.2 μm and a refractive index in a range of from 1.3 to 1.6, said anti-reflection layer being formed on an upper surface of said transparent hard coating layer.

7. A filter for a plasma display panel comprising:
(A) a transparent laminate comprising:
a transparent substrate;
four to five units each comprising a high refractive index transparent film, and a silver type transparent electrical conductor film, said four to five units being laminated successively on said transparent substrate; and
an outermost high refractive index transparent film disposed on said four to five units,
wherein said high refractive index transparent film is an optically transparent film having a refractive index of from 1.5 to 2.7, and said silver type transparent electrical conductor film has a thickness in a range of from 5 to 20 nm,
wherein said transparent laminate satisfies the following conditions (i) to (iv):
(i) a thickness of the silver type transparent electrical conductor film disposed in a first layer with reference to said transparent substrate is substantially equal to a thickness of the outermost silver type transparent electrical conductor film in said four to five units with reference to said transparent substrate;
(ii) a thickness of the silver type transparent electrical conductor film in each of other layers is 1.2 to 1.8 times as large as the thickness of said silver type transparent electrical conductor film in the first layer;
(iii) a thickness of the high refractive index transparent film in a first layer with reference to said transparent substrate is substantially equal to a thickness of said outermost high refractive index transparent film, and is 2.8 to 4.2 times as large as the thickness of said silver type transparent electrical conductor film in the first layer; and
(iv) the thickness of the high refractive index transparent film in each of other layers is 5.6 to 8.4 times as large as the thickness of said silver type transparent electrical conductor film in the first layer; and
(B) an anti-reflection layer having a thickness in a range of from 0.05 to 0.2 μm and a refractive index in a range of from 1.3 to 1.6, said anti-reflection layer being formed on an upper surface of said outermost high refractive index.

8. A filter for a plasma display panel comprising:
(A) a transparent laminate comprising:
a transparent substrate;
four to five units each comprising a high refractive index transparent film and a silver type transparent electrical conductor film, said four to five units being laminated successively on said transparent substrate; and
an outermost high refractive index transparent film disposed on said four to five units,
wherein said high refractive index transparent film is an optically transparent film having a refractive index of from 1.5 to 2.7, and said silver type transparent electrical conductor film has a thickness in a range of from 5 to 20 nm,
wherein said transparent laminate satisfies the following conditions (i) to (iv):
(i) a thickness of the silver type transparent electrical conductor film disposed in a first layer with reference to said transparent substrate is substantially equal to a thickness of the outermost silver type transparent electrical conductor film in said four to five units with reference to said transparent substrate;

(ii) a thickness of the silver type transparent electrical conductor film in each of other layers is 1.2 to 1.8 times as large as the thickness of said silver type transparent electrical conductor film in the first layer;

(iii) a thickness of the high refractive index transparent film in a first layer with reference to said transparent substrate is substantially equal to a thickness of said outermost high refractive index transparent film, and is 2.8 to 4.2 times as large as the thickness of said silver type transparent electrical conductor film in the first layer; and (iv) the thickness of the high refractive index transparent film in each of other layers is 5.6 to 8.4 times as large as the thickness of said silver type transparent electrical conductor film in the first layer; and (B) a film comprising:

a transparent film substrate;

a transparent hard coating layer and an anti-reflection layer formed on a first surface of said transparent film substrate, said film being bonded to a surface of said outermost high refractive index transparent film of said transparent laminate through a transparent pressure sensitive adhesive layer formed on a second surface of said transparent film substrate.

9. A filter for use in a plasma display panel filter according to claim 5, further comprising a transparent pressure sensitive adhesive layer having a thickness in a range from 10 to 500 μm being formed on a rear surface of said transparent laminate.

10. A plasma display panel display unit wherein a filter according to claim 9 is bonded to a front display glass portion of a plasma display panel through a transparent pressure sensitive adhesive layer.

11. A front plate for a plasma display panel, wherein said front plate is provided with a filter according to claim 9, and a transparent molded body disposed through an air layer on a front side of the plasma display panel, said filter being bonded through a transparent pressure sensitive adhesive layer to a surface of said transparent molded body opposite to the plasma display panel side.

12. A front plate for a plasma display panel according to claim 11, wherein one of an anti-glare layer and an anti-Newton-ring layer is formed directly on the plasma display panel side of said transparent molded body disposed through said air layer, or is formed on a transparent film and bonded through a transparent pressure sensitive adhesive layer to the plasma display panel side of said transparent molded body.

13. A front plate for use in a plasma display panel, wherein a filter according to claim 9, is bonded through a transparent pressure sensitive adhesive layer to a plasma display panel side surface of a transparent molded body disposed through an air layer on a front side of the plasma display panel, and wherein a hard coating layer and an anti-reflection layer are formed directly on a surface of said transparent molded body opposite to the plasma display panel side, or is formed on a transparent film and bonded through a transparent pressure sensitive adhesive layer to said surface of said transparent molded body opposite to the plasma display panel side.

14. A plasma display panel display unit wherein one of an anti-glare layer and an anti-Newton-ring layer is formed directly on a front display glass portion of a plasma display panel, or is formed on a transparent film and bonded through a transparent pressure sensitive adhesive layer to said front display glass portion of said plasma display panel so that a front plate for a plasma display panel as described in claim 11 is provided.

15. A filter for use in a plasma display panel filter according to claim 6, further comprising a transparent pressure sensitive adhesive layer having a thickness in a range from 10 to 500 μm being formed on a rear surface of said transparent laminate.

16. A filter for use in a plasma display panel filter according to claim 7, further comprising a transparent pressure sensitive adhesive layer having a thickness in a range from 10 to 500 μm being formed on a rear surface of said transparent laminate.

17. A filter for use in a plasma display panel filter according to claim 8, further comprising a transparent pressure sensitive adhesive layer having a thickness in a range from 10 to 500 μm being formed on a rear surface of said transparent laminate.

18. A front plate for use in a plasma display panel, wherein a filter according to claim 15, is bonded through a transparent pressure sensitive adhesive layer to a plasma display panel side surface of a transparent molded body disposed through an air layer on a front side of the plasma display panel, and wherein a hard coating layer and an anti-reflection layer are formed directly on a surface of said transparent molded body opposite to the plasma display panel side, or is formed on a transparent film and bonded through a transparent pressure sensitive adhesive layer to said surface of said transparent molded-body opposite to the plasma display panel side.

19. A front plate for use in a plasma display panel, wherein a filter according to claim 16, is bonded through a transparent pressure sensitive adhesive layer to a plasma display panel side surface of a transparent molded body disposed through an air layer on a front side of the plasma display panel, and wherein a hard coating layer and an anti-reflection layer are formed directly on a surface of said transparent molded body opposite to the plasma display panel side, or is formed on a transparent film and bonded through a transparent pressure sensitive adhesive layer to said surface of said transparent molded body opposite to the plasma display panel side.

20. A plasma display panel display unit wherein one of an anti-glare layer and an anti-Newton-ring layer is formed directly on a front display glass portion of a plasma display panel, or is formed on a transparent film and bonded through a transparent pressure sensitive adhesive layer to said front display glass portion of said plasma display panel so that a front plate for a plasma display panel as described in claim 13 is provided.

* * * * *